United States Patent [19]

Okada et al.

[11] Patent Number: 5,428,820
[45] Date of Patent: Jun. 27, 1995

[54] ADAPTIVE RADIO RECEIVER CONTROLLER METHOD AND APPARATUS

[75] Inventors: Tomoyuki Okada, Palatine; Robert Baranowski, Crystal Lake, both of Ill.

[73] Assignee: Motorola, Schaumburg, Ill.

[21] Appl. No.: 130,612

[22] Filed: Oct. 1, 1993

[51] Int. Cl.$^6$ .............................................. H04B 7/00
[52] U.S. Cl. .................................... 455/38.3; 455/343
[58] Field of Search ...................... 455/38.2, 38.3, 343; 340/825.44; 377/39

[56] References Cited

U.S. PATENT DOCUMENTS

| | | | |
|---|---|---|---|
| 4,513,430 | 4/1985 | Vora et al. | 377/39 |
| 4,598,258 | 7/1986 | Babano | 455/343 |
| 5,140,698 | 8/1992 | Toko | 455/345 |

*Primary Examiner*—Edward F. Urban
*Assistant Examiner*—Mary M. Lin
*Attorney, Agent, or Firm*—Kirk W. Dailey

[57] ABSTRACT

A portable radiotelephone (101) operating in a radio communication system (100), the portable radiotelephone including power consumption controller circuitry (200). The radiotelephone system (100) is designed such that the portable radiotelephone (101) needs to only intermittently receive paging information from a remote transceiver (103) during a control mode. The power consumption controller circuitry (200) utilizes a low cost, low power, low frequency oscillator (237) in conjunction with hardware and software for shutting down a portion of the radiotelephone (101) for a sleep period, when the radiotelephone (101) is not receiving information from the remote transceiver (103). The current sleep period is adapted depending upon the timing accuracy of the previous sleep period.

4 Claims, 3 Drawing Sheets

-PRIOR ART-

ADAPTIVE RADIO RECEIVER CONTROLLER METHOD AND APPARATUS

FIELD OF THE INVENTION

This invention generally relates to radio receivers and more specifically, to a method and apparatus for adaptively controlling the power consumption of a time division multiple access (TDMA) radio receiver used in a portable digital radiotelephone.

BACKGROUND OF THE INVENTION

There are two fundamental modes of operation in a digital radiotelephone, namely, a control mode and a communication mode. During the control mode, the portable radiotelephone intermittently receives paging information from a remote transceiver while waiting to either receive or place a phone call using the radiotelephone. After initially powering up, the portable radiotelephone turns on the radio receiver until the radio receiver receives a frame of information from the remote transceiver, which contains all of the timing information for the radiotelephone. Once the timing information is received, the portable radiotelephone receives paging information on an intermittent basis. FIG. 4 is an illustration of the timing requirements for a particular radiotelephone system defined by the RCR specification (second generation cordless telephone system standard specification, August, 1992, section 4.2.7). Timing graph 401 is an illustration of the timing requirements for a remote transceiver and timing graph 403 is a timing graph for a radio receiver used in a portable radiotelephone. Typically, the portable radio receiver is on for one slot every four seconds, or 0.0156 percent as derived from the RCR specification. It is well known that lowering power consumption and extending battery life of a portable radiotelephone is desirable. Thus, it would be advantageous to shut off as much circuitry as possible during this four second stand-by period to reduce the power consumption of the portable radiotelephone. Additionally, it would be advantageous to inexpensively implement this power saving feature in the portable radiotelephone.

DESCRIPTION OF A PREFERRED EMBODIMENT

Generally, the preferred embodiment encompasses a portable radiotelephone operating in a radio communication system. The radio communication system has two modes of operation, namely, a control mode and a communication mode. During the control mode, the radiotelephone system is designed such that the portable radiotelephone needs to only intermittently receive paging information from a remote transceiver. In order to conserve power and cost, the radiotelephone utilizes a low cost, low power 32 kHz watch crystal or an inexpensive RC (resistor/capacitor) oscillator in conjunction with hardware and software for shutting down a portion of the radiotelephone, when not receiving information from the remote transceiver. The portion of the radio receiver shut down includes the reference oscillator.

Figure 1:
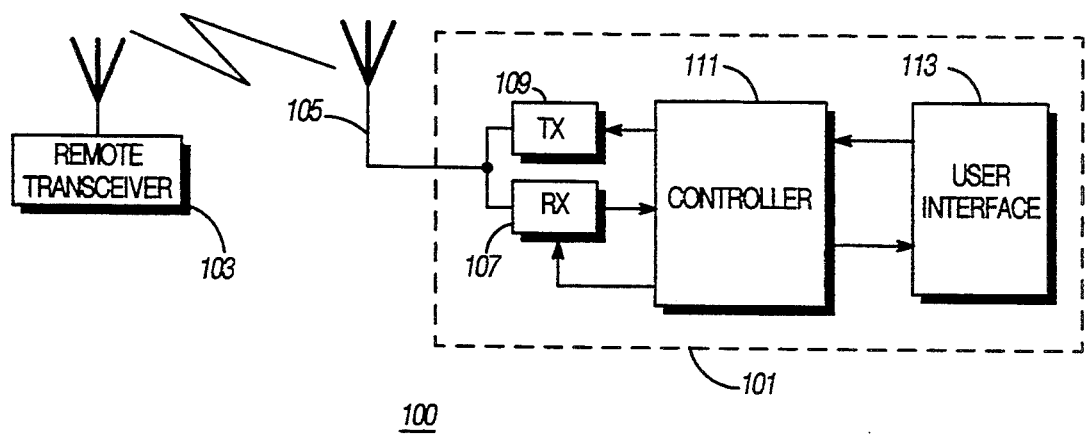
FIG. 1 is an illustration in block diagram form of a radiotelephone communication system.

FIG. 1 is an illustration in block diagram form of a radiotelephone system in accordance with the present invention. In the radiotelephone system, a remote transceiver 103 sends and receives radio frequency (RF) signals to and from mobile and portable radiotelephones within a fixed geographic area served by the remote transceiver 103. Radiotelephone 101 is one such radiotelephone served by the remote transceiver 103.

While receiving signals from the remote transceiver 103, the radiotelephone 101 uses the antenna 105 to couple the RF signal and to convert the RF signal into an electrical RF signal. The electrical RF signals are received by the radio receiver 107 for use within a radiotelephone 101. The receiver 107 demodulates the received electrical RF signal and outputs a symbol signal for use by the controller 111. The controller 111 formats the symbol signal into voice or data for use by the user interface 113. The user interface 113 is used to convey information between a user and the radiotelephone 101, typically including a microphone, a speaker, a display, and a keypad.

Upon the transmission of RF signals from the portable radiotelephone 101 to the remote transceiver 103, the voice and/or data signals from the user interface 113 are processed by the controller 111. The processed signals are input into the transmitter 109. The transmitter 109 converts the data into electrical RF signals. The electrical RF signals are converted into RF signals and output by the antenna 105. The RF signals are received by the remote transceiver 103 and converted for use within the land line telephone system.

Figure 2:
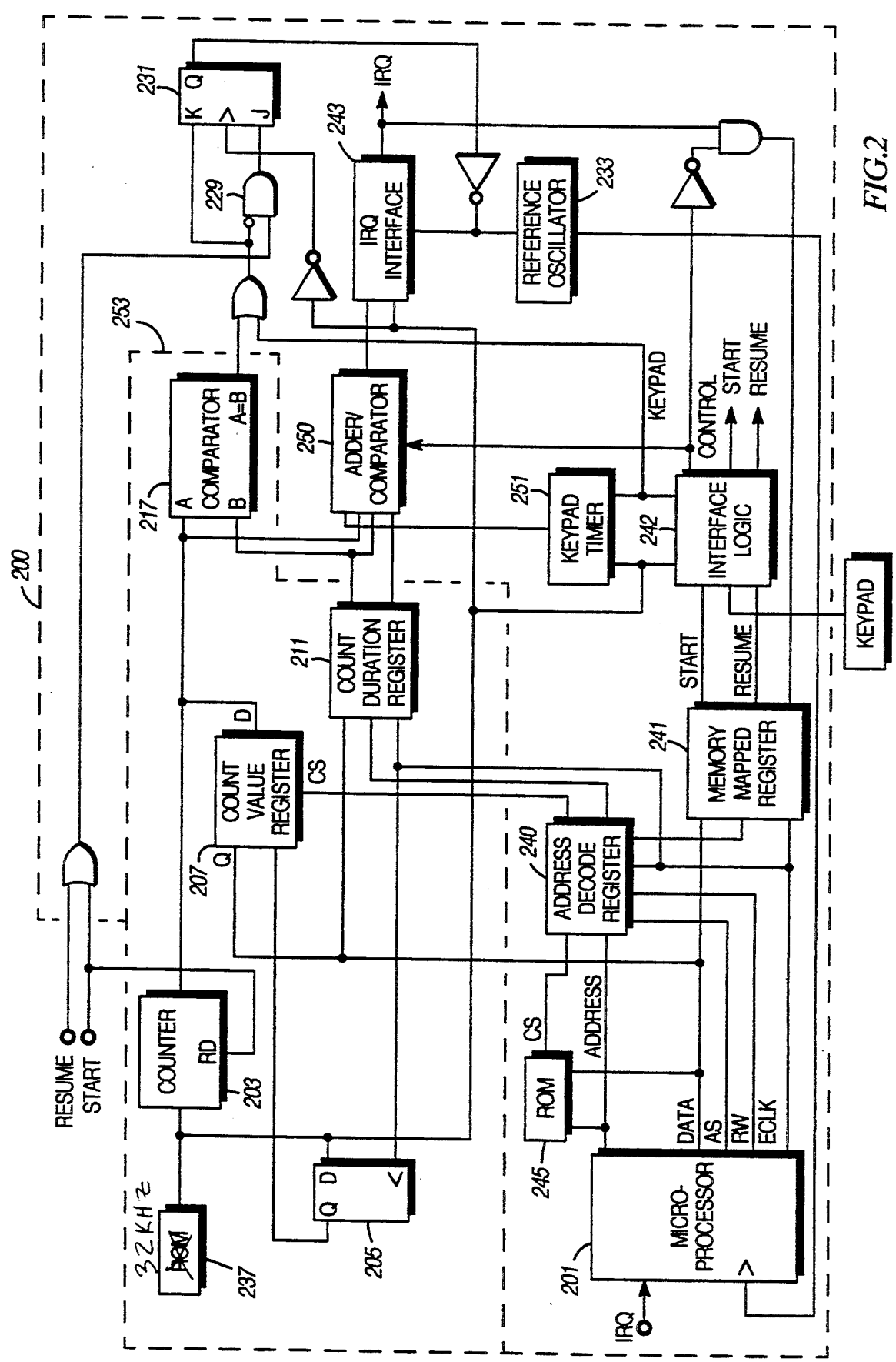
FIG. 2 is an illustration in block diagram form of a controller for use in a radiotelephone in accordance with the present invention.

Additionally, the controller 111 is used to control the power to the receiver 107 and the circuitry contained therein. FIG. 2 is an illustration in block diagram form of the power consumption controller circuitry 200 contained within controller 111. The microprocessor 201 receives clock pulses and interrupts, and generates address bus signals, data bus signals, and bus control signals AS, P/W, and E_CLK. The address and data bus are coupled to a ROM (read only memory) 245 which supplies instructions and data to the microprocessor 201. In the preferred embodiment, the microprocessor 201 is a MC68HC11 available from Motorola, Inc.. All the bus outputs of the microprocessor 201 are received by an address decode register 240. The address decode register 240 generates select lines for a count-duration register 211, a count value register 207, and a memory-mapped control register 241. The memory-mapped control register 241 latches data from the microprocessor 201 when the select from the address decode register 240 is active. The memory-mapped control register 241 outputs timer start and timer resume signals. These outputs and a key-press indication are received by the interface logic block 242, which generates pulses on the rising edges of the inputs based upon the current state of the oscillator timer. The interface logic block 242 also generates the control input for the adder/comparator 250, There are two primary counters in the power consumption controller circuitry 200, namely the oscillator counter 203 and the keypad timer counter 251. These two counters are clocked by a low frequency oscillator 237. In the preferred embodiment, a 32kHz oscillator is used as the low frequency oscillator.

The oscillator counter 203 is reset upon a start signal being received from the interface logic block 242. The output of the oscillator counter 203 is compared to the count duration value programmed into duration register 211 by comparator 217. The oscillator counter 203 changes asynchronously to the E_CLK from microprocessor 201. A flip-flop 205 and the count value register 207 are used to line up data changes of the oscillator counter 203 with the E—CLK signal. The output of the comparator, the power control signal, is used to turn on the reference oscillator 233 through a control flip-flop 231. The reference oscillator 233 is turned off when control flip-flop 231 receives either a start pulse or a resume pulse from interface logic block 242. The key-press pulse from interface logic block 242 is OR'd with the output of the comparator 217 so that it too can turn the reference oscillator on in control flip-flop 231. The output of reference oscillator 233 is divided down and used as the clock input for microprocessor 201. The oscillator counter 203, the count value register 207, the count duration register 211, the comparator 217 and the low frequency oscillator 237 make up what is referred to as a timing device 253.

The second counter in the design is the keypad timer 251. The keypad counter 251 is used to delay the interrupt to the microprocessor 201 after a keypress. The output of the keypad timer 251 is fed into an adder/comparator 250 which generates an interrupt to the microprocessor 201. The interrupt to the microprocessor 201 is delayed by a programmed delay time after the reference oscillator 233 is turned on. The programmed delay time allows the reference oscillator 233 to stabilize before circuits are brought up by the microprocessor 201. After receiving the interrupt, the microprocessor 201 determines whether the interrupt was due to a keypress. If there was no keypress, the microprocessor 201 sets up the hardware to receive the expected UW. If there was a keypress, the microprocessor 201 processes the keypress. Next, the microprocessor 201 reads the current oscillator counter value and compares it to the count duration value. The microprocessor resumes the sleep interval if difference between the current counter value and the count duration value is great enough. If the microprocessor 201 does not resume the sleep interval, the microprocessor 201 monitors the oscillator counter value until it equals the count duration value plus the programmed delay time.

The adder/comparator 250 receives the following inputs: the output from the keypad timer 251, the output from the oscillator counter 203, the count duration value from the duration register 211, the delay compare from the duration register 211, and a control bit from the interface logic 242. If the control bit from the interface logic 242 indicates a key-press, then the adder/comparator 250 compares the keypad timer 251 to the delay compare from the duration register 211 to generate the interrupt. If the interface logic 242 does not indicate a key-press, then the adder/comparator 250 compares the count value from the oscillator counter 203 to the sum of the count compare and the delay compare from the duration register 211. The output of adder/comparator 250 is received by IRQ (interrupt request) interface 243 which also uses the reference oscillator control signal and the low frequency oscillator 237 to generate the actual interrupt pulse that is received by the microprocessor 201.

This interrupt pulse is also ANDed with the inverted control bit from interface logic 242 to produce a signal that shows the interrupt was caused by a key-press. This signal is used to set a bit in the memory-mapped control register 241. The memory-mapped control register also sources the timer set signal and the timer resume signal. The microprocessor 201 reads the memory-mapped control register 241 to determine if a key-press caused the interrupt. The bit in the memory-mapped control register 241 is cleared after the microprocessor 201 reads the register 241.

Figure 4:
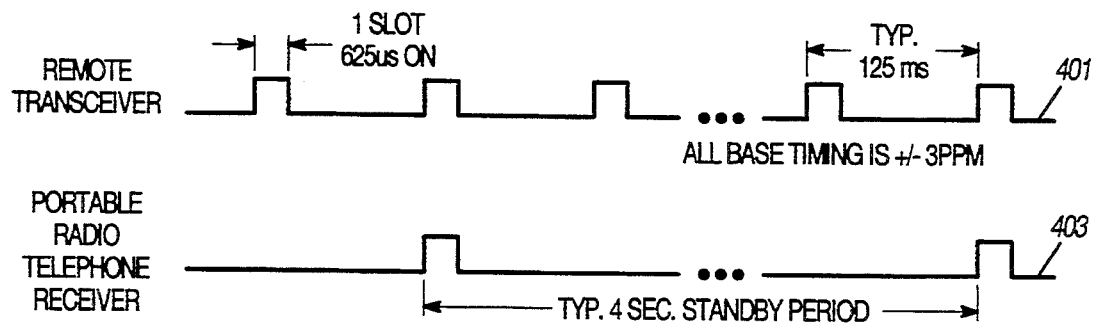
FIG. 4 is an illustration of a timing diagram in accordance with the present invention.

During the control mode, the portable radiotelephone 101 intermittently receives paging information from the remote transceiver 103. At initial power up, the portable radiotelephone 101 powers on its receiver 107 until the receiver 107 receives a frame of information from the remote transceiver 103 which contains all of the timing information for the radiotelephone 101. Once this timing information is received, the portable radiotelephone 101 starts receiving on an intermittent basis as illustrated in FIG. 4. In this intermittent receive mode, the portable radiotelephone 101 can conserve power consumption by turning off as much of the circuitry as possible.

Figure 3:
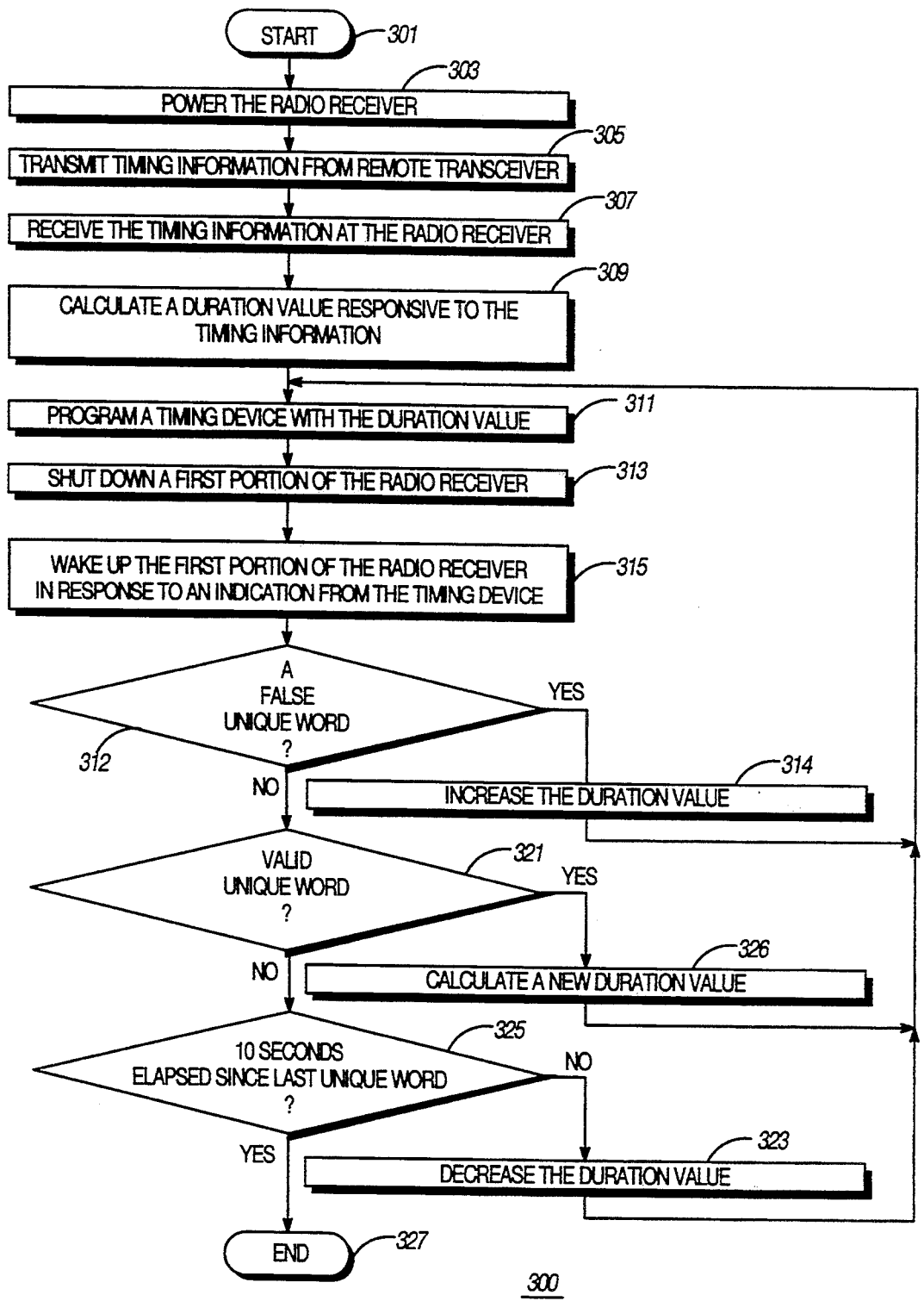
FIG. 3 is an illustration of a process flow chart in accordance with the present invention.

FIG. 3 is an illustration in flow chart form of a process 300 implemented in the radiotelephone system 100 for controlling the power consumption therein. Process 300 begins by powering the radio receiver 107 continuously in function block 303. In function block 305, the remote transceiver 103 transmits a slot containing a unique word (UW), transceiver ID and timing information as defined in the RCR specification to the radiotelephone 101. The UW is a predefined sequence indicating the beginning of each slot. At function block 307, the radiotelephone 101 receives the slot containing the timing information. Additionally, the controller 111 reads the current sleep counter value from the count value register 207. The radiotelephone 101 then waits to receive the next slot transmitted from the remote transceiver 103 based on the timing information received. During this time the reference oscillator 233 and the microprocessor 201 remain powered up, providing the timing control for the intermittent receive interval.

At function block 309, the sleep duration value is calculated. With the reference oscillator 233 running, the controller 111 waits for the reception of the next slot. Upon reception of the next slot the controller 111 reads the current oscillator counter value and subtracts the previously read oscillator counter value. The sleep duration value is equal to this difference less a set up time. The set up time is determined by the characteristics of the specific receiver and reference oscillator in the radiotelephone. In the preferred embodiment, the set up time is equal to 30 mS. Reading the oscillator counter values, using the reference oscillator 233 as a timing reference, automatically calibrates the oscillator counter 203 to the intermittent receive interval independent of the exact frequency of the low frequency oscillator 237.

At function block 311, the count duration register 211, is programmed with the previously calculated sleep duration value.

At function block 313, the controller 111 shuts down a first portion of the radio receiver 313. In the preferred embodiment, the circuitry shut down includes the entire receiver 107 and a portion of the controller 111, including the microprocessor 201, and the reference oscillator 233. The microprocessor 201 is shut down with a STOP instruction, shutting down all the internal clocks. The microprocessor 201 is only awakened at the execution of an external interrupt. Note that the amount and specific circuitry shut down may be modified for a particular application while still operating within the scope of the invention disclosed herein.

At function block 315, the timing device 253 turns on the reference oscillator 233, waits a predetermined amount of time, then sends an interrupt command to the microprocessor 201. The predetermined amount of time is equal to the startup time as previously discussed. After receiving the interrupt command, the microprocessor 201 turns on the circuitry previously shut down.

At decision block 312, the controller 111 checks to see if a false UW is received while the radio receiver 107 is fully powered. There are two potential causes of a false UW detection, namely, random noise and reception of a UW from another remote transceiver. The causes and probability of receiving a false UW in the preferred embodiment are discussed in detail below.

If a false UW is received, the timer value is increased at function block 314. By increasing the timer value, the window in which the receiver 107 could potentially receive a false UW is reduced. Once the timer value is increased, the process returns to function block 311.

If a false UW is not received at decision block 312, the process 300 checks to see if a valid UW has been received at decision block 321. The controller 111 validates the UW by checking the contents of the data that follows the UW. The data contains such information as remote transceiver ID that the controller 111 can use to verify if the information is from the correct remote transceiver 103.

Once a valid UW is received, a new count duration value is obtained at function block 326. The new count duration value is obtained using the current count duration value. Specifically, the process checks the amount of time elapsed between the previous start signal was generated by the interface logic block 242 and the time when the UW was received and adjusts the count duration value accordingly. Once the new count duration value is obtained, the process 300 returns to function block 311.

If a valid UW is not received when checked at decision block 321, then at decision block 325, the process 300 checks to see if 10 seconds has elapsed since the last UW was received at function block 315. If 10 seconds has not elapsed, then the process 300 decreases the timer value at function block 323 and returns to function block 311. If 10 seconds has elapsed, then the process ends at 327. In the preferred embodiment, when the 10 seconds has elapsed, the process returns to function block 303.

An alternative method of calculating the timer value at function block 309 may be substituted. The alternative calculation depends upon the type of low frequency oscillator 237. Preferably, an Epson C-type crystal is used for low cost. This crystal has error criteria of plus/minus 20 ppm (parts per million) error at 23 degrees Celsius and plus/minus 200 ppm over minus 10 to plus 60 degrees Celsius. The plus/minus 200 ppm results in significant timing error after the four second stand-by of plus/minus 0.8 mS (milliseconds). This timing error translates to the receiver turning on 2.5 slots earlier than necessary as explained in detail below.

The timing error due to the large frequency tolerance is a problem when the portable radiotelephone 101 is attempting to synchronize to the remote transceiver 103. The problem arises because the portable radiotelephone 101 is attempting to turn on its radio receiver 107 at the appropriate time to receive the intermittently received information from the remote transceiver 103 based on the timing from a crystal oscillator having a large error. In order to compensate for the worst case timing error of plus/minus 0.8 mS, the portable radiotelephone 101 must turn on its radio receiver 107 at least 0.8 mS in advance. This early turn on time in conjunction with the 0.8 mS timing error means that the radio receiver 107 can be on for 1.6 mS before receiving the information from the remote transceiver 103. This 1.6 mS translates to 2.5 slots as defined by the RCR specification. During this 2.5 slots, the radio receiver 107 can pick the synchronization sequence unique word (UW) in error, potentially introducing a false UW detection.

Specifically, the timer value is calculated as follows:

$$T_{period} = (T_i \times T_{fr}) - (T_i \times T_{fr}) \times C_{tol}$$

$$TimerValue = (T_{period} - T_{now})/T_{crystal}$$

where:
1. $T_{period}$ = adjusted intermittent receive period
2. $T_i$ = timing information in the form of the number of TDMA frames between receptions
3. $T_{fr}$ = a TDMA frame period = 5ms
4. $T_{now}$ = Current time since the last receiver turn-on
5. $T_{crystal}$ = Watch crystal period
6. $C_{tol}$ = Crystal tolerance in ppm $\times$ E-6

Once the proper UW is received, the sleep duration value may be set using previous counter values read from the oscillator counter 203 as discussed above concerning function block 326. The microprocessor 201 can dynamically read the number of 32 kHz clock pulses between successive UWs and can use this value to program the next sleep period. As the crystal resolution slowly changes over time, the microprocessor reads different counter values between UWs and programs the count duration register accordingly. This method works because the crystal stays stable between successive UWs. Without the current invention employed in the preferred embodiment, the probability of receiving a false UW from either random noise or receiving a UW from another remote transceiver causes problems in the system. First, the chance of a false 32-bit UW reception caused by random noise is extremely low. If the receiver is continuously on, the probability of receiving a false UW is Bit rate per second/32 bit sequence match which is equal to $384,000/2^{32} = 0.000089$ per second. Which equals one false detection per 186 minutes. Since the receive window is open for 2.5 slots per four seconds, the actual probability of receiving a false UW is, $0.000089 \times 2.5$ slots times 625 uS (microseconds)/four seconds. Which is equal to one false detection per 331 days.

Second, the potential of receiving a false UW from another remote transceiver is alarmingly high when the portable telephone has the receiver turned on to receive the incoming slot in advance to compensate for the crystal tolerance. Since the remote transceiver in the preferred embodiment transmits eight times a second at most, the time window of interest is 1second/8 slots = 125 ms/slot. For one neighboring remote transceiver, probability of receiving a neighboring UW is calculated as follows:

$$P = Trxwin/Ttxwin = 0.01248 = 1.25\%$$

where:

| | | |
|---|---|---|
| 1. Trxwin | = Ttxclk × 2.5 slots × 240 clocks/slot = 1.56 mS = portable radiotelephone's receive window | |
| 2. Ttxwin | = neighboring base transmit window for 8 slots/second = 125 mS | |
| 3. Ttxclk | = transmit clock period = 2.6 uS | |
| 4. P | = probability of receiving a neighboring UW | |

Therefore, the second cause of neighboring remote transceivers are the major cause of the alarmingly high probability (1.25%) of a false UW reception. A false UW reception causes the real UW to be missed, potentially causing the incoming phone call to be missed.

Using the preferred embodiment with the alternative timer value calculation described herein, any timing error from the low frequency oscillator 237 is reduced to the resolution of the oscillator timer 203. This resolution error exists because the UW can be received during any portion of a single period of the timer. The maximum error due to the oscillator counter resolution during the shut down period is two clock periods: One clock period for the timer being set during any portion within a clock period and a second clock period because the previous timer value could have been read during any portion of the clock period. This error translates to a time of 62.5 uS for a 32 kHz (kilohertz) plus/minus 0 ppm crystal.

The total error to be compensated is equal to the sum of the error caused by the oscillator counter resolution and the error caused by the remote transceiver timing. The remote transceiver 103 must generate the UW every 4 seconds with an accuracy of 3 ppm, resulting in worst case error of 12 uS. Thus, the total error to be compensated is equal to 75 uS. Because of this resolution error, the receive window must be open for 150 uS. This is a fraction of the 1.6 mS required without the use of this invention.

The probability of receiving a false UW due to the conditions discussed above, while employing the preferred embodiment with the alternative timer value calculation, is calculated as follows:

1. Due to random noise 0.000089 = 150uS/4S = 1 false UW per 9.5 years.
2. Due to UW from other remote transceiver 20.8 e -X -6 = 58 = 0.12%**

** this calculation is a theoretical probability, the actual measured probability would be closer to zero since successful receptions of the UW from the remote transceiver 103 would interfere with the reception of a false UW from the other remote transceivers.

Thus, employing the preferred embodiment with the alternative timer value calculation, the probability of receiving a false UW is reduced from 1.25% to 0.12%. Additionally, utilizing the preferred embodiment with the preferred timer value calculation reduces the probability of receiving a false UW further. The reduction in the probability is accomplished by fleeing the timer value calculation from the accuracy of the low frequency oscillator as described above. The invention disclosed reduces the power consumption of the radiotelephone 101 while sufficiently protecting the reception of the unique words using a low frequency oscillator.

What is claimed is:

1. A method of controlling a radio receiver for use in a radio communication system, the radio communication system including a first radio receiver and a first remote transmitter, the first remote transmitter transmitting timing information and unique words, the radio receiver receiving unique words and including a first low frequency oscillator, a reference oscillator, and a user interface the method comprising the steps of:
    A) powering the radio receiver
    B) receiving the timing information at the radio receiver;
    C) calculating a count duration value responsive to the timing information;
    D) programming a timing device with the count duration value;
    E) shutting down a first portion of the radio receiver circuitry, including at least the reference oscillator;
    F) waking up the first portion of the radio receiver circuitry in response to an indication from the timing device;
    G) increasing the count duration value responsive to receiving a false unique word via the radio receiver circuitry;
    H) repeating steps d through g until a first condition is met, the first condition selected from the group consisting of a first predetermined time is lapsed and a valid unique word is received;
    I) decreasing the count duration value in response to the first predetermined time is elapsing;
    J) repeating steps a through h in response to said step of decreasing;
    K) calculating a new count duration value responsive to receiving a valid unique word; and
    L) repeating steps d through j responsive to said step of calculating a new count duration value.

2. A method of controlling a radio receiver in accordance with claim 1 wherein step F further comprises the steps of:
    M) waking up a second portion of the radio receiver circuitry in response to an indication from the user interface, the second portion of the radio receiver circuitry a subset of the first portion;
    N) processing the indication from the user interface;
    O) comparing the count duration value with a current state of the timing device, resulting in a first decision; and
    P) repeating step E or step F responsive to the first decision of step 0.

3. A radio for use in a radio communication system, the radio communication system including a first remote transmitter, the first remote transmitter transmitting timing information and unique words, the radio comprising:
    a radio receiver for receiving timing information and unique words from the remote transmitter, the radio receiver including a reference oscillator;
    a timing device; and
    a controller for performing the steps of:
    calculating a count duration value responsive to the timing information, including increasing the count duration value responsive to receiving a false unique word,
    programming the timing device with the count duration value,
    shutting down a first portion of the radio receiver circuitry, the first portion including at least the reference oscillator, waking up the first portion of the radio receiver circuitry in response to an indication from the timing device, and calculating a new count duration value responsive to receiving a valid unique word.

4. The radio in accordance with claim 3 further comprising:

a user interface for receiving an indication from a user; and the controller further performing the steps of:

waking up a second portion of the radio receiver circuitry in response to an indication from the user interface, the second portion of the radio receiver a subset of the first portion, processing the indication from the user interface, and comparing the count duration value with a current state of the timing device, resulting in a decision.

* * * * *